Aug. 9, 1932.    D. J. MAYER    1,870,860
MOUNTING FOR ANTIFRICTION BEARINGS
Filed July 25, 1930

INVENTOR.
Daniel J. Mayer,
BY George D. Richards
ATTORNEY

Patented Aug. 9, 1932

1,870,860

UNITED STATES PATENT OFFICE

DANIEL J. MAYER, OF BELLEVILLE, NEW JERSEY, ASSIGNOR TO METAL TEXTILE CORPORATION, OF WEST ORANGE, NEW JERSEY, A CORPORATION OF DELAWARE

MOUNTING FOR ANTIFRICTION BEARINGS

Application filed July 25, 1930. Serial No. 470,624.

This invention relates, generally, to improved means for mounting anti-friction bearings, and particularly for mounting bearings of the ball type.

Heretofore, the common practice in mounting ball-bearings required the housing to be counter-bored to the exact outside diametric dimension of the bearing, the latter being then fitted into the counter-bore by pressing the same thereinto. Such practice necessitates extreme care and accuracy in the making of the counter-bore, for should the dimension of the latter be scant, resulting in the fit of the bearing therein being too tight, the outer race ring of the latter is likely to be unduly contracted or otherwise deformed, thus giving rise to excessive friction and uneven wear; if, on the other hand, the dimension of the counter-bore is excessive, resulting in the fit of the bearing therein being too loose, the outer race ring of the latter is likely to crawl or be otherwise displaced, also resulting in undue wear and inefficiency. Other methods of mounting ball-bearings comprise the provision of screw adjustments, set-screws or similar elements for engaging the bearing, but such methods also entail risk of relative displacement of the ball race rings resulting in increased side thrust against the balls and consequent undue friction and wear.

It is the object of this invention to provide novel means for mounting ball-bearings, and other forms of anti-friction bearings, which obviates necessity for producing accurately dimensioned counter-bores in the receiving housing, and yet assuring the firm and strong gripping and holding of the outer race without risk of either deforming the same or displacing the same from normal operative relation to and alignment with the inner race, and so as to prevent axial creeping of the outer race.

Another object of this invention is to provide a bearing mounting which will permit adjustment of the bearing axially of the shaft served thereby, should such adjustment be desired.

Other objects of this invention, not at this time more particularly enumerated, will be understood from the following detailed description of the same.

An illustrative embodiment of this invention is shown in the accompanying drawing, in which:—

Figure 1:
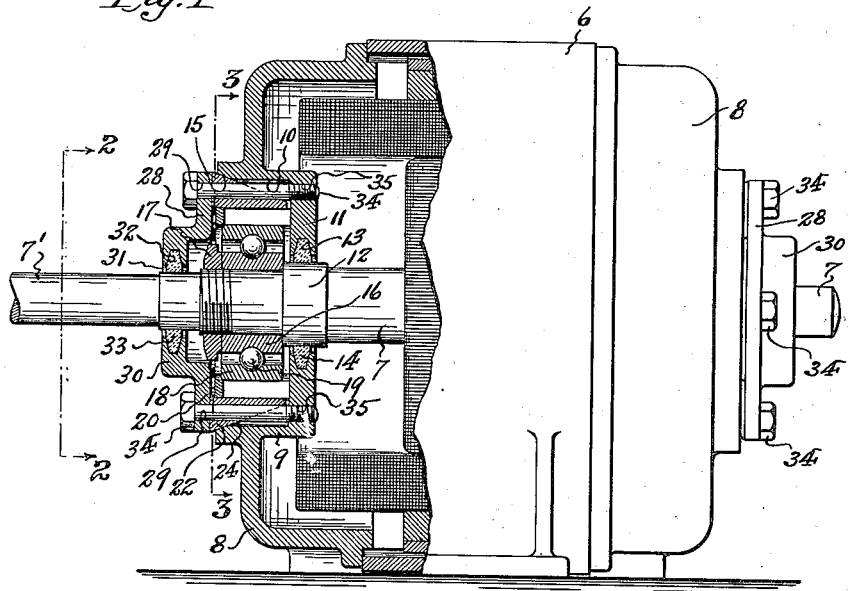
Figure 2:
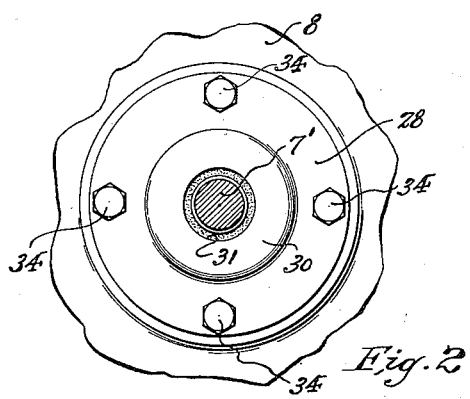
Figure 3:
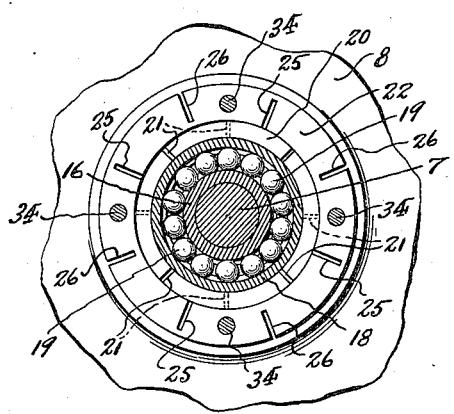
Figure 4:
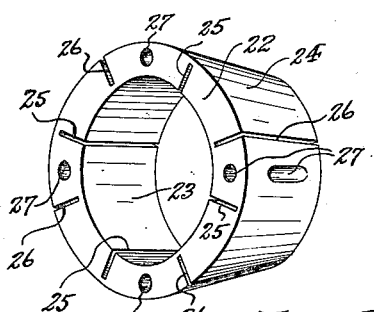
Figure 5:
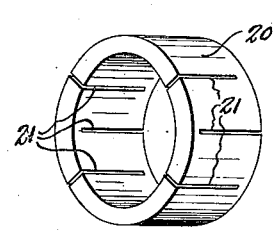

Fig. 1 shows an electric motor equipped with the novel means for mounting ball-bearings in which the armature shaft thereof is supported, said views being in part section; Fig. 2 is a sectional view, taken on line 2—2 in Fig. 1; Fig. 3 is a sectional view, taken on line 3—3 in Fig. 1; Fig. 4 is a perspective view of the contractible wedge cone of the mounting; and Fig. 5 is a perspective view of the contractible holding ring or bushing of the mounting.

Similar characters of reference are employed in the above-described views, to indicate corresponding parts.

For the purpose of illustration the novel anti-friction bearing mounting is shown in connection with an electric motor 6 for serving the armature shaft 7 thereof, although it will be understood that the same may be applied to any other kind of machinery wherein anti-friction bearings for shafts or other rotating elements are employed.

The end frame plates 8 of the motor casing are provided with chambered housing members 9 concentric to the axis of the armature shaft 7, said housing members providing a circular receiving chamber 10 which is closed at its inner end by the transverse annular end flange or shoulder 11 which extends toward and surrounds the armature shaft 7. Preferably the armature shaft 7 is provided with an enlarged portion 12 adjacent said flange or shoulder 11. Formed in the flange or shoulder 11 is an annular channel or groove 13 in which is seated a felt washer 14. The internal marginal portions of the housing member 9, at the outer end of the chamber 10, is formed to provide an annular conical or tapered seat 15.

Engaged over the shaft 7 is the inner race ring 16 of a ball-bearing device, the same being preferably disposed to abut the enlarged portion 12. If desired, the portion of the shaft 7 on which said inner race ring 16 is set may be threaded to receive a keeper nut 17 which abuts the outer end of said race ring 16, thus firmly holding the latter against axial movement relative to the shaft. Concentric to the inner race ring 16 is the outer race ring 18 of the ball-bearing device, and the anti-friction balls 19 are operatively disposed between the inner and outer race rings in the well-known manner.

The reference character 20 indicates a contractible holding ring or bushing, which is disposed around and so as to embrace the outer race ring 18. The inner end of said holding ring or bushing is arranged to abut against the flange or shoulder 11 of the housing member 19, being thus stopped against inward axial shifting under pressure of the wedge cone device to be subsequently described, and consequently being prevented from exerting any axially displacing thrust upon the outer race ring likely to disturb the proper alignment of the latter relative to the inner race ring of the bearing. To render the holding ring or bushing easily contractible, the same is provided with radial slits 21 extending through from one end thereof toward but terminating short of the other end thereof. Preferably said radial slits are arranged to alternately extend from opposite ends of the holding ring or bushing body, and are also equi-spaced around the circumference of the latter.

The reference character 22 indicates a wedge cone ring, the same having a central cylindrical bore 23 to easily receive or slide over the holding ring or bushing 20, and having a tapered or conical outer circumferential surface 24. To render the wedge cone ring easily contractible, the same is provided with inner longitudinal slits 25 extending radially outward from the bore 23 toward but terminating short of the tapered or conical surface 24. Alternately spaced circumferentially relative to the inner slits 25 are outer longitudinal slits 26 extending radially inward from the tapered or conical surface 24 toward but terminating short of the bore 23. The described arrangement of slits 25 and 26 while preferable may be varied and otherwise arranged if desired. Extending longitudinally or endwise through the wedge cone ring body are a plurality of bolt-ways 27.

The reference character 28 indicates a cap plate, through the flange of which extend bolt-holes 29 to match the bolt-ways of the wedge cone ring 22. Said cap plate is provided with a hollow central boss 30, having an opening 31 through which projects the outer extension 7' of the shaft 7. Formed in the margin of the opening 31 of said boss 30 is an annular channel or groove 32 in which is seated a felt washer 33 to surround the shaft.

After the holding ring or bushing 20 is in place, the wedge cone ring 22 is slid telescopically over the same until its tapered or conical surface 24 engages the annular conical or tapered seat 15 of the housing member 9. When the wedge cone ring is thus assembled, the cap plate 28 is engaged over the shaft so that its flange abuts the outer end of said wedge cone ring, with its bolt-holes 29 registered with the bolt ways 27 of the latter. Adjusting bolts 34 are now passed through the cap plate flange and wedge cone ring so as to screw into threaded openings 35 provided for their reception in the flange or shoulder 11 of the housing member 9.

When the parts are all assembled, in the manner above described, the adjusting bolts 34 are tightened, thus causing the cap-plate flange to thrust inwardly upon the wedge cone ring, whereby the tapered or conical surface 24 of the latter is moved against tapered seat 15 of the housing member 9 so as to exert a contracting pressure upon the wedge cone ring. The contraction of the wedge cone ring is in turn transmitted to the holding ring or bushing 20, which being held against longitudinal displacement by its abutment against the housing shoulder or flange 11, is consequently constricted about the outer race ring 18 so as to grip and firmly hold the same without displacing the same axially, and consequently operating to maintain the same in proper opposed alignment with the inner race ring 16, both during the period of adjustment and thereafter.

The novel anti-friction bearing mounting of this invention lends itself readily to easy and quick assembly and disassembly, without necessity for using a bearing puller or other special tool for removing the same. The seat 15 of the housing member 9 should be machined to assure concentric accuracy relative to the axis of the shaft served by the bearing, but otherwise no great precaution or mathematical nicety need be exercised in fitting the members of the assembly together.

The novel mounting offers exceptional advantage when applied to electric motors, since the position of the bearing may be appreciably altered along the axis of the shaft so as to assure proper position of the armature or rotor relative to the field or stator, and to this end adjusting spacing washers (not shown) may be inserted between the shaft portion 12 and the inner race ring 16 of the bearing, as may be desired. It will be recognized, however, that the mounting is capable of use in all kinds of machinery, and with all the advantages heretofore referred to.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having thus described my invention, I claim:—

1. A mounting for anti-friction bearings, comprising a chambered housing to surround the bearing and shaft served by the latter, said housing having a stop shoulder at its inner end, a contractible cylindrical bushing around said bearing and abutting said stop shoulder, a contractible wedge cone ring having a cylindrical bore to fit over said bushing, said wedge cone ring being longitudinally movable intermediate said housing and said bushing for contracting the latter into gripping engagement with the bearing, and means to both actuate said wedge cone ring and retain the same in actuated position.

2. A mounting for anti-friction bearings, comprising a chambered housing to surround the bearing and shaft served by the latter, said housing having a stop shoulder at its inner end, a radially split circumferentially contractible cylindrical bushing around said bearing and abutting said stop shoulder, a circumferentially contractible wedge cone ring having a cylindrical bore to fit over said bushing, said wedge cone ring being longitudinally movable intermediate said housing and said bushing for contracting itself and in turn the latter into holding engagement with the bearing, and means to both actuate said wedge cone ring and retain the same in actuated position.

3. A mounting for anti-friction bearings, comprising a chambered housing to surround the bearing and shaft served by the latter, said housing having a stop shoulder at its inner end, a radially split circumferentially contractible cylindrical bushing around said bearing and abutting said stop shoulder, a circumferentially contractible wedge cone ring having a cylindrical bore to fit over said bushing, said wedge cone ring being longitudinally movable intermediate said housing and said bushing for contracting itself and in turn the latter into holding engagement with the bearing, said wedge cone ring having bolt ways therethrough, a cap-plate to engage the outer end of said wedge cone ring, and adjusting bolts extending through said cap-plate and wedge cone ring and into threaded engagement with said housing.

4. A mounting for anti-friction bearings, comprising a chambered housing to surround the bearing and shaft served by the latter, said housing having a stop shoulder at its inner end and an annular conical seat at its outer end concentric to the axis of the shaft, a radially split circumferentially contractible cylindrical bushing around said bearing and abutting said stop shoulder, a radially split contractible wedge cone ring having a cylindrical bore to slidingly fit over said bushing and a tapered outer surface, and said wedge cone ring being engageable with and longitudinally movable relative to the conical seat of said housing to cause contraction thereof operative to constrict said bushing into holding engagement with said bearing.

5. A mounting for anti-friction bearings, comprising a chambered housing to surround the bearing and shaft served by the latter, said housing having a stop shoulder at its inner end and an annular conical seat at its outer end concentric to the axis of the shaft, a radially split contractible cylindrical bushing around said bearing and abutting said stop shoulder, a contractible wedge cone ring having a cylindrical bore to slidingly fit over said bushing and a tapered outer surface, said wedge cone ring having longitudinal slits extending radially into the body thereof from both its interior and exterior sides, said wedge cone ring being engageable with and longitudinally movable relative to the conical seat of said housing to cause contraction thereof operative to constrict said bushing into holding engagement with said bearing, and adjusting bolts extending through said wedge cone ring into threaded engagement with said housing.

6. A mounting for anti-friction bearings, comprising a chambered housing to surround the bearing and shaft served by the latter, said housing having a stop shoulder at its inner end and an annular conical seat at its outer end concentric to the axis of the shaft, a radially split contractible cylindrical bushing around said bearing and abutting said stop shoulder, a contractible wedge cone ring having a cylindrical bore to slightly fit over said bushing and a tapered outer surface, said wedge cone ring having longitudinal slits extending radially into the body thereof from both its interior and exterior sides, said wedge cone ring being engageable with and longitudinally movable relative to the conical seat of said housing to cause contraction thereof operative to constrict said bushing into holding engagement with said bearing, said wedge cone ring having bolt-ways therethrough, a cap-plate to engage the outer end of said wedge cone ring, and adjusting bolts extending through said cap-plate and wedge cone ring and into threaded engagement with said housing.

In testimony, that I claim the invention set forth above I have hereunto set my hand this 17th day of July, 1930.

DANIEL J. MAYER.